United States Patent
Rodbro et al.

(10) Patent No.: US 10,470,232 B2
(45) Date of Patent: Nov. 5, 2019

(54) COMMUNICATION SYSTEM

(71) Applicant: Microsoft Technology Licensing, LLC, Redmond, WA (US)

(72) Inventors: Christoffer A. Rodbro, Stockholm (SE); Sergey Sukhanov, Stockholm (SE); Tanel Erm, Tallinn (EE); Jonas Nils Rune Lindblom, Solna (SE)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 115 days.

(21) Appl. No.: 15/347,622

(22) Filed: Nov. 9, 2016

(65) Prior Publication Data

US 2018/0092152 A1    Mar. 29, 2018

(51) Int. Cl.
*H04W 36/00* (2009.01)
*H04W 36/32* (2009.01)
(Continued)

(52) U.S. Cl.
CPC ......... *H04W 76/18* (2018.02); *H04L 41/0668* (2013.01); *H04M 1/82* (2013.01);
(Continued)

(58) Field of Classification Search
CPC ............... H04L 41/0668; H04M 1/82; H04M 2203/152; H04W 76/027; H04W 36/0022; H04W 36/32; H04W 36/0016
See application file for complete search history.

(56) References Cited

U.S. PATENT DOCUMENTS

| | | |
|---|---|---|
| 6,351,464 B1 | 2/2002 | Galvin et al. |
| 6,665,293 B2 | 12/2003 | Thornton et al. |

(Continued)

FOREIGN PATENT DOCUMENTS

| | | |
|---|---|---|
| WO | WO-2008050325 | 5/2008 |
| WO | 2011022214 A1 | 2/2011 |
| WO | WO-2016020224 | 2/2016 |

OTHER PUBLICATIONS

"3CX: Extension Management", Available at: http://www.3cx.com/docs/extension-management/, Jul. 24, 2014, 8 pages.
(Continued)

*Primary Examiner* — Edan Orgad
*Assistant Examiner* — Nourali Mansoury
(74) *Attorney, Agent, or Firm* — NovoTechIP International PLLC (57) ABSTRACT

A method of controlling a call between first and second user terminals, the method comprising: during the call, detecting a failure of a connection between the first user terminal and a packet-switched network; and in response, causing the call to be conducted at least part way via a PSTN network, via a connection between the first user terminal and the PSTN network. The call may be initiated by the first user terminal (such that the first user terminal is the caller and the second is the callee). The call may be initially conducted, prior to the failure, via a packet-switched connection between the first user terminal and a packet-switched network. The method may be implemented by a client application run on the first user terminal. Alternatively, the method may be implemented by a server.

18 Claims, 2 Drawing Sheets

(51) Int. Cl.
*H04L 12/24* (2006.01)
*H04W 76/18* (2018.01)
*H04M 1/82* (2006.01)
*H04M 7/00* (2006.01)

(52) U.S. Cl.
CPC ..... *H04M 7/0057* (2013.01); *H04W 36/0016* (2013.01); *H04W 36/0022* (2013.01); *H04W 36/32* (2013.01); *H04M 2203/152* (2013.01)

(56) References Cited

U.S. PATENT DOCUMENTS

| | | | |
|---|---|---|---|
| 6,819,667 B1 | 11/2004 | Brusilovsky et al. | |
| 6,868,080 B1* | 3/2005 | Umansky | H04L 12/5692 370/354 |
| 7,382,767 B2 | 6/2008 | Stumer et al. | |
| 7,613,170 B1* | 11/2009 | Grabelsky | H04L 12/5692 370/352 |
| 8,639,225 B2 | 1/2014 | Nzumafo | |
| 8,649,495 B1 | 2/2014 | McClintock et al. | |
| 8,724,619 B2 | 5/2014 | Bush | |
| 8,798,239 B2 | 8/2014 | Stifelman et al. | |
| 9,160,856 B2 | 10/2015 | Mairs | |
| 2003/0039339 A1 | 2/2003 | Luehrig et al. | |
| 2004/0047339 A1 | 3/2004 | Wang et al. | |
| 2006/0029195 A1 | 2/2006 | Mullis et al. | |
| 2007/0070948 A1* | 3/2007 | Kezys | H04L 12/6418 370/331 |
| 2007/0223455 A1 | 9/2007 | Chang et al. | |
| 2009/0017802 A1 | 1/2009 | Zhang et al. | |
| 2009/0086950 A1 | 4/2009 | Vendrow et al. | |
| 2009/0316688 A1 | 12/2009 | Meenavalli | |
| 2010/0034198 A1* | 2/2010 | Gan | H04L 12/66 370/352 |
| 2010/0195641 A1 | 8/2010 | Tsai | |
| 2011/0044321 A1 | 2/2011 | Rosenberg et al. | |
| 2011/0312321 A1* | 12/2011 | Ramachandran | H04W 36/0022 455/426.1 |
| 2013/0006908 A1* | 1/2013 | Schindler | G06N 5/02 706/46 |
| 2013/0294443 A1 | 11/2013 | Kahn | |
| 2014/0004833 A1 | 1/2014 | Kiddie et al. | |
| 2014/0040175 A1* | 2/2014 | Sundararajan | H04L 12/6418 706/12 |
| 2014/0253666 A1 | 9/2014 | Ramachandran et al. | |
| 2015/0223039 A1 | 8/2015 | Toksvig et al. | |
| 2016/0165570 A1* | 6/2016 | Kim | H04W 4/023 455/456.2 |
| 2017/0041742 A1 | 2/2017 | Toksvig et al. | |
| 2017/0202049 A1* | 7/2017 | Totadamane Ramappa | H04W 36/0022 |
| 2018/0103151 A1 | 4/2018 | Erm | |

OTHER PUBLICATIONS

"Avaya Business Communications Manager 6.0 Planning and Engineering", In Publication of Avaya Inc., May 2010, 305 pages.

"Enabling the Auto PSTN Fallback of the SPA3000", Retrieved on: May 5, 2016—Available at: http://www.cisco.com/c/en/us/support/docs/unified-communications/spa3102-voice-gateway-router/108726-pqa-108726.html, 2 pages.

"Gigaset C610/610A IP your perfect companion", Retrieved on: May 5, 2016—Available at: http://gse.gigaset.com/fileadmin/legacy-assets/A31008-M2312-A601-1-UZ19_en_AE.pdf, 249 pages.

"How to connect to VoIP Connections Hosted Lync Server from Lync client 2013 on a Smart Phone", Available at: http://www.voip-connections.com/howto/how-to-connect-to-voip-connections-hosted-lync-server-from-lync-client-2013-on-a-smart-phone/, Aug. 15, 2013, 9 pages.

"RingCentral: Missed Call Notification", Available at: https://www.ringcentral.com/office/features/missed-call-notification/overview.html#view_demo_pop_up, Jun. 6, 2013, 2 pages.

"Set general options for your Android device", Available at: https://support.office.com/en-us/article/Set-general-options-for-your-Android-device-4290b9fe-66b9-4fef-85a1-dcfb8906db2d—Retrieved on: May 5, 2016, 3 pages.

Dupuis,"SMS notifications for missed calls expanding mobility for TDM environments", In Proceedings of the 3rd annual conference on Research in information technology, Oct. 15, 2014, pp. 71-74.

Ketchum,"How to Use "Skype To Go" to Make Local Calls", Available at: http://smallbusiness.chron.com/use-skype-go-make-local-calls-44211.html, Jul. 1, 2012, 3 pages.

Nurhalim,"PSTN VoIP Application Support System Design using mobile Short Message Service (SMS): Case Study of PSTN VoIP Missed Call Notification to mobile phone by SMS", In Proceedings of International Conference on Electrical Engineering and Informatics,, Jul. 17, 2011, 4 pages.

Robichaux,"Skype for Business: PSTN Calling", Available at: http://windowsitpro.com/skype-business/skype-business-pstn-calling, Aug. 19, 2015, 8 pages.

"International Search Report and Written Opinion Issued in PCT Application No. PCT/US2017/052121", dated Dec. 1, 2017, 10 Pages.

"Non-Final Office Action", U.S. Appl. No. 15/337,463, dated Oct. 10, 2017, 8 pages.

"Non Final Office Action Issued in U.S. Appl. No. 16/050,629", dated Nov. 29, 2018, 6 Pages.

* cited by examiner

Fig. 1

Fig. 2

COMMUNICATION SYSTEM

RELATED MATTERS

This application claims priority under 35 U.S.C. 119 or 365 to Great Britain Application No. 1616310.7 filed Sep. 26, 2016, the disclosure of which is hereby incorporated by reference in its entirety.

TECHNICAL FIELD

The present disclosure relates to voice calls made over a PSTN network and voice calls made over a packet-switched network.

BACKGROUND

Traditional voice calls can be made via a Public Switched Telephone Network (PSTN). This refers to one or a combination of the world's circuit switched telephone networks, over which users' telephones can addressed based on the standardized system of telephone numbers. PSTN networks include landline networks as well as mobile cellular networks. Thus a mobile phone can make and receive phone calls over the PSTN network, by means of a dialler application installed on the mobile phone which uses a wireless transceiver in the phone to connect to a base station of the cellular network via the voice channel. The dialler application can then connect to another mobile or static terminal over the cellular network (and if not on the same network, onwards via another cellular network or landline network of the PSTN).

It is also known to enable a user to conduct a voice call over a packet-switched network, which may comprise a single proprietary network or a combination of multiple constituent networks. E.g. the packet-switched network may comprise a private intranet such as a company intranet, and/or a wide area internetwork such as that commonly referred to as the Internet. In the case of calls made using Internet Protocol as the packet protocol, such calls are referred to as Voice over Internet Protocol (VoIP)) calls. To be able to make or receive a packet-switched call such as a VoIP call, the user at each end has a communication client application installed on his or her respective user terminal (or equivalently uses his or her user terminal to access a server-hosted instance of the client, e.g. a web-hosted instance accessed via a general purpose web browser on the user terminal). The client application uses a network interface on the user terminal to connect to the packet-switched network (e.g. Internet), and thereby establish a communication session with the other user terminal over the packet-switched network.

For packet-switched calls, the user terminal can be a traditional desktop computer, but can also be a mobile terminal such as a smartphone, tablet or laptop, or even a wearable mobile terminal such as a smart watch or smart glasses. The mobile terminal may connect to the packet-switched network (e.g. the Internet) via the data channel of the cellular network, or via a wireless access point of a wireless local area network (WLAN), e.g. via a short-range radio frequency (RF) technology such as Wi-Fi or Bluetooth.

It is also known for a hybrid call to be conducted part way over a PSTN network and part way over a packet-switched network such as the Internet. To achieve this, a gateway is provided between the two different types of network. Thus the user terminal can connect to the gateway by PSTN and the user terminal on the other end of the call can connect to the gateway via the circuit-switched network, or vice versa, with the call being routed via the gateway.

Presently the calling user (the user who initiates the call) chooses manually prior to the call whether to make a packet-switched or PSTN call, and the call remains conducted via the same type of network throughout. In one known system, there is provided a PSTN fallback whereby if the calling user sends a call establishment request to the callee user over the Internet requesting a call by VoIP, but the called user does not answer, then the client application on the calling user's terminal automatically attempts to redial the callee via a PSTN network.

SUMMARY

However, the known PSTN fallback mechanism simply places the decision in the hands of the callee as opposed to the caller. Further, this is still a decision made once prior to the call being established. It is recognized herein on the other hand that there are other reasons to select between PSTN and VoIP, including in some cases mid call. Particularly, it would be advantageous to adapt the type of call, PSTN or packet-switched, in dependence on the currently available connectivity to the packet-switched network.

For instance, a fully packet-switched call may be preferred as these tend to be cheaper, and can also be of higher audio bandwidth (allowing better quality and/or stereo). Nowadays a packet-switched call can also comprise one or more additional communication media types such as video, screen-sharing, or collaborative tools such as a virtual whiteboard. On the other hand, a connection to a packet-switched network is not always available. E.g. at any given time a mobile user terminal may not find itself within range of a suitable wireless access point for connecting to the Internet; whilst at the same time the user terminal may not have cellular capability, or at least may have lost cellular data connectivity, or the data channel may have deteriorated to an insufficient level for VoIP calling, or the user may simply have selected a setting disallowing use of the cellular data channel (the user may not wish to incur the expense of using the data channel over the cellular network if the user does not have an unlimited data plan, or is roaming). Nonetheless, the dedicated voice channel of the cellular network may still be available.

According to one aspect disclosed herein, there is provided a near-end user terminal for conducting a call with a far-end user terminal, between a near-end user being a user of the near-end terminal and a far-end user being a user of the far-end terminal. The near-end user terminal comprises at least one first network interface operable to form a connection between the near-end user terminal and a packet switched network, for conducting the call over the packet switched network using a packet-based voice calling service. The near-end user terminal also comprises a second network interface operable to form a connection between the near-end user terminal and a PSTN network. Further, the near-end user terminal comprises memory comprising one or more memory units, the memory storing a communication client application; and processing apparatus comprising one or more processing units, the processing apparatus being arranged to run the communication client application. The communication client application is configured so as, when run on the processing apparatus, to perform operations of: (a) detecting a failure in the connection between the near-end terminal and the packet switched network; and (b) in response to the detection of said failure, conducting the call at least part way over the PSTN network by using the second interface to conduct the call via the connection between the near-end user terminal and the PSTN network. The failure in question may comprise a loss of the packet-switched connection, or a deterioration below a certain defined quality level.

Thus if the near-end user terminal loses connectivity to the packet-switched network (including the possibility that this may happen mid call, after already having initiated the call via the packet-switched connection), then advantageously the client on the near-end user terminal can detect this and re-establish the call via the PSTN network. This gives at least the near-end user a relatively seamless experience in the event of loss of connectivity at the near end.

In embodiments the near-end user terminal is a mobile terminal, and both the first and second interfaces and their respective connections are wireless. E.g. the packet-switched network may comprise the internet and the connection to the internet may be via WLAN such as a Wi-Fi network (e.g. a Wi-Fi or Bluetooth network). The PSTN network may comprise a mobile cellular network such as a 3GPP network (e.g. a GSM, 3F, LTE, 4G or 5G network). If the near-end user terminal loses connectivity to the WLAN (e.g. loses Wi-Fi) then the near-end client will reconnect the call via the cellular network.

According to another aspect disclosed herein, there is provided a server-based implementation of the above, in which the server detects the failure and causes the calling user to be called by the callee or gateway via a PSTN network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of the present disclosure and to show how embodiments may be put into effect, reference is made to the accompanying drawings in which.

DETAILED DESCRIPTION OF EMBODIMENTS

The following discloses a mechanism for automatically providing a local phone number for a VoIP client to dial in the case of a lost data connection. In a VoIP client running on a mobile smartphone or the like, a PSTN number for the callee can be obtained and stored at the client side for potential future use. If the quality of the data connection used for VoIP is severely degraded or lost completely, the client automatically places a call over the PSTN network, so that the conversation can be continued without needing to resort to manual PSTN calling. This therefore allows a seamless transition into a PSTN call when the data connection deteriorates or fails completely (or at least relatively seamless compared to having to manually redial).

There are at least two ways of obtaining the PSTN number at call setup. The first is to obtain a local gateway phone number for the remote user from a suitable gateway service. The second is to read the remote person's phone number from their profile maintained within the VoIP service. The first approach may be preferable in many ways: the gateway-based PSTN callback will be a local phone call even if the remote user is in a different country, and furthermore the remote user can still pick up the call in their VoIP client. In fact, in embodiments, for the remote user the experience can be almost completely seamless, and appear more like a "reconnection" experience. There are also various other potential variants, as will be discussed in more detail shortly.

In some embodiments the triggering of the PSTN callback may be completely automated without requiring any user input, or may be initiated automatically but still needs to be confirmed by the user, or it may even be completely triggered by the user by some user interface element (e.g. the user can trigger PSTN callback by shaking his or her user terminal).

Figure 1:
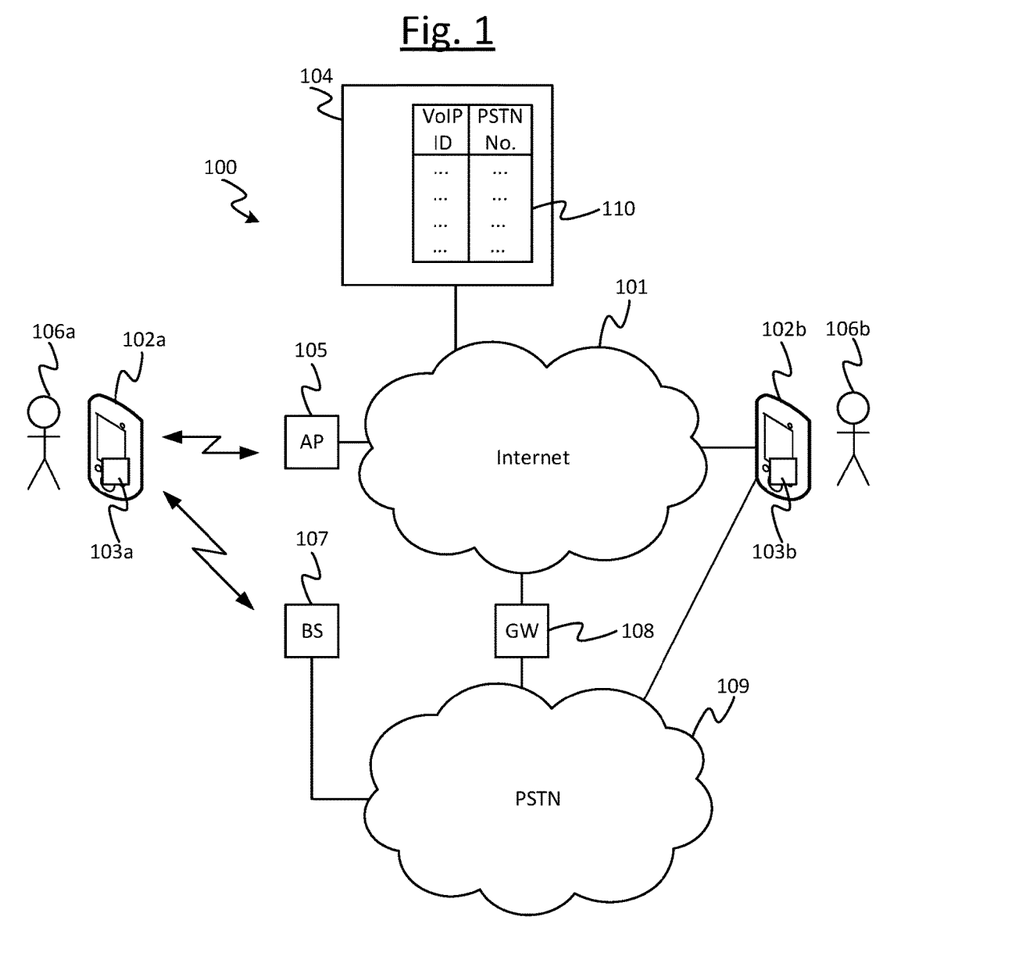
FIG. 1 is a schematic block diagram of a communication system.
Figure 2:
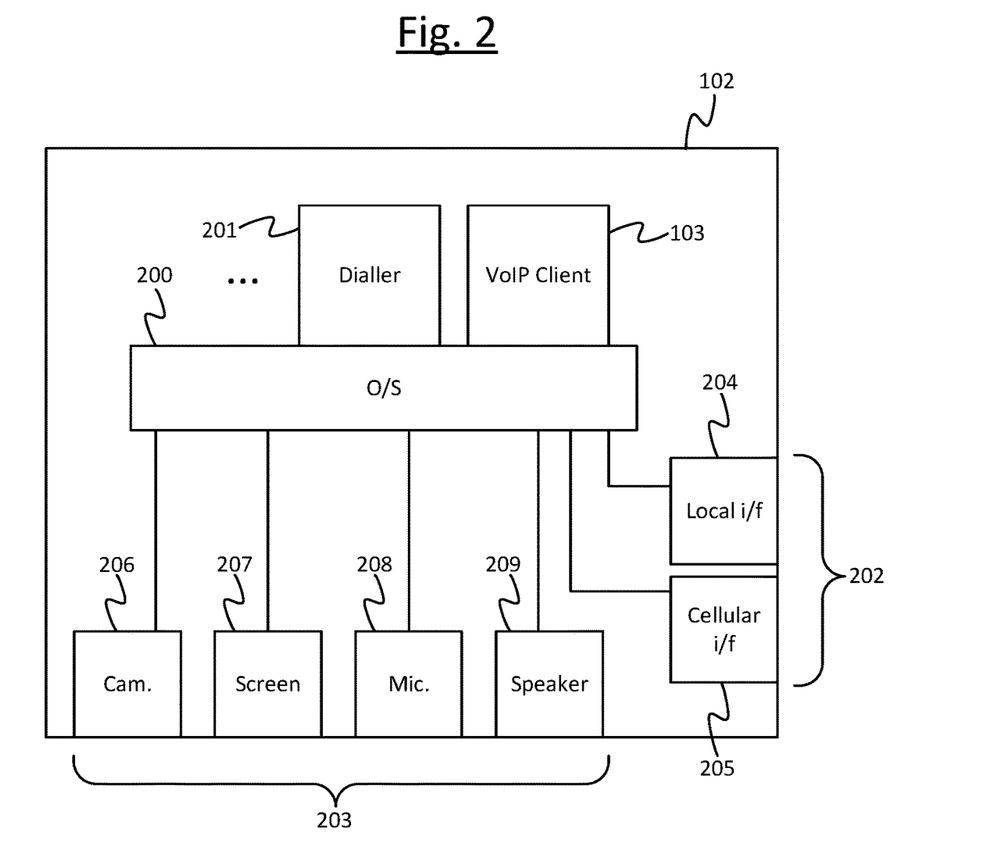
FIG. 2 is a schematic block diagram of a user terminal.

Embodiments of the present disclosure are now discussed further with reference to FIGS. 1 and 2.

FIG. 1 shows a communication system 100 comprising: a packet-switched network 101, a PSTN network 109, a first user terminal 102a and a second user terminal 102b. The packet-switched network 101 may comprise a single proprietary packet-switched network or may comprise a plurality of constituent packet-switched networks. In embodiments the packet-switched network 101 comprises a wide-area internetwork such as the Internet. The PSTN network comprises one or more circuit switched networks, such as one or more mobile cellular networks, and/or one or more landline networks. Each of the first and second user terminals 102a, 102b may take the form of a static user terminal such as a desktop computer, or more preferably a mobile user terminal such as a smartphone, tablet or laptop, or even a wearable mobile user terminal such as a smart watch or a pair of smart glasses. Many other user terminals 102 of such forms may also be present and participating in the communication system, but for the sake of simplicity these are not illustrated in FIG. 1. Note also that the first and second user terminals 102a, 102b do not necessarily need to take the same form.

Each of the first and second user terminals 102a, 102b is operable to connect to both the packet-switched network 101 and the PSTN network 109.

In embodiments where the first user terminal 102a is a mobile terminal, the user terminal 102a may be configured to connect to the packet-switched network via a wireless access point 105 of the packet switched network using a wireless access technology, e.g. a short-range RF technology such as Wi-Fi or Bluetooth. E.g. this may be a wireless access point of a wireless local area network (WLAN), such as may be found in the home or office, or in a public place such as a caé, bar, hotel, airport, station or train, etc. However, it is not excluded that the first user terminal 102a may connect to the packet-switched network 101 via a wired connection such as via a wired modem or an Ethernet network.

The second user terminal 102b may also be configured to connect to the packet-switched network 101 by any of the means described above in relation to the first user terminal 102a, e.g. via a second wireless access point of a different WLAN in another geographic location, though for the sake of simplicity the second wireless access point is not shown in FIG. 1.

Each of the first and second user terminals 102a, 102b is installed with a respective instance of a communication client application 103a, 103b. The communication client 103, when run on the respective user terminal 102, is operable to establish a live, two-way voice call with the client 103 on another user terminal 102 over the packet-switched network 101, by means of a packet-switched voice calling technology such as VoIP. The voice call may also comprise one or more other media steams in addition to the voice, such as video, instant messaging, screen sharing or virtual whiteboard data.

The following will be described from the perspective of the first user terminal 102a being the near-end user terminal and the second user terminal 102b being the far-end user terminal, though it will be appreciated that this is just a matter of perspective and conversely similar things may be said of the second user terminal 102b in relation to the first user terminal 102a, or indeed other combinations of user terminals 102.

The communication system comprises a server 104 providing a packet-switched communication service comprising a packet-switched voice calling service, e.g. a VoIP service, and optionally one or more associated media communication services such as video calling, instant messaging, screen sharing or one or more collaborative tools such as a virtual whiteboard. Note that a server as referred to herein refers to a logical entity which may comprise one or more physical server units at one or more geographical sites.

The first user terminal 102a is used by a first user 106a and the second user terminal 102b is used by a second user 106b. Other users of other user terminals (not shown) are also users of the communication service. Each of the users has a user ID (e.g. username) identifying him or her within the communication service. The user IDs are stored in the server 104, where they are mapped to addresses identifying the respective user terminals 102 within the packet-switched network 101 (e.g. IP addresses in the case of the Internet or any other IP-based network).

To instigate a call, the client 103a on the near-end user terminal 102a submits the user ID (e.g. username) of the far-end user 106b to the server 104, in order to look up the address of the far-end user terminal 102b within the packet-switched network 101 (e.g. to look up the IP address). The near-end client 103a then sends a call establishment request from the near-end user terminal 102a to the client 103b on the far-end user terminal 102b, using the address of the far-end terminal 102b which it has looked up on the server 104. If the far-end user 106b chooses to accept the call through his or her respective client 103b, then the far-end client 103b returns a response to the near-end client 103a on the near-end terminal 102a. The two clients 103a, 103b then set up a communication session between them over the packet-switched network 101 in order to exchange live voice data captured from the respective users 106a, 106b, and optionally other accompanying media such as live video of one another in the case of a video call, and/or IM messages typed by the users 106a, 106b, and/or a live screen share so that one of the users 106 can see what is currently being displayed on the screen of the other's terminal 102. The voice and/or other media of the call may be routed via the server 104; or alternatively, having used the server 104 for the address look-up, the call media may be transmitted directly between. A combination of such approaches could also be used (e.g. one route for voice and another for other media such as IM).

Regarding the PSTN network 109, if the first (near-end) user terminal 102a is a mobile user terminal then the PSTN network 109 comprises at least one mobile cellular network that supports a dedicated voice channel (and optionally a general purpose data channel as well). E.g. the mobile cellular network may be a 3GPP network such as a GSM, 3G, LTE, 4G or 5G network, etc. The mobile cellular network comprises a plurality of wireless base stations 107 (sometimes also called node-Bs), one of which is illustrated in FIG. 1. If the near-end terminal 102a is within range one of the base stations 107 then it can connect to the PSTN network 109 in order to make traditional cellular voice calls. Note however, it is not excluded that the near-end user terminal 102a may connect to a wired part of the PSTN network 109 via a wired means such as an old-fashioned landline.

The second (far-end) user terminal 102b may also be configured to connect to the PSTN network 109 by any of the means described above in relation to the first user terminal 102a, e.g. via a second base station in another geographic location, though for the sake of simplicity the second base station is not shown in FIG. 1. Also, note again that the PSTN network 109 may comprise multiple different interconnected circuit-switched telephone networks, such as mobile cellular networks of different operators, and the near- and far-end user terminals 102a, 102b may connect through different such networks.

To make a call over the PSTN network 109, the near-end user 106a can enter the PSTN phone number of the far-end user terminal 102b into a dialler application on the near-end terminal 102a, which submits the phone number to the PSTN network 109. This causes the far-end terminal 102b to "ring" (e.g. emit a ringtone and/or vibrate) alerting the far-end user 106b to the incoming call. If the far-end user 106b selects to answer on his or her user terminal 102b, this causes the PSTN network 109 to establish a voice call between the near- and far-end user terminals 102a, 102b via the dedicated voice channel of the PSTN network 109. Other applications on the near-end terminal 102a such as the VoIP client 103a may also be able to instigate a call in this manner by interfacing with the dialler application or acting through the operating system on the near-end user terminal 102a.

In embodiments, the communication system 100 further comprises a gateway 108 between the packet-switched network 101 and the PSTN network 109, arranged to enable hybrid PSTN/packet-switched calls. In this case the server 104 stores a database 110 mapping PSTN phone numbers to respective ones of the user IDs (e.g. usernames) which identify users within the packet-switched communication service (e.g. VoIP service). These PSTN phone numbers are all phone numbers of the gateway 108 as far as the PSTN network 109 is concerned. If the near-end user terminal 102a submits one of these telephone numbers to the PSTN network 109, then this will connect the near-end user terminal 102a to the gateway 108 over the PSTN network, via the dedicated voice channel. In turn, the gateway 108 is triggered to look up in the database 110 the respective user ID mapped to the particular PSTN number that was used to dial into the gateway 108, e.g. the user ID of the second user 106b. Based on this, the gateway 108 establishes a communication session between the gateway 108 and the user terminal 102 of the user 106 identified by the user ID given by said look-up, e.g. the far-end user terminal 102b. Thus this allows the near-end user terminal 102a to establish a voice call with the far-end user terminal 102b part way over the PSTN network 109, in a leg between the near-end user terminal 102a and the gateway 108, and part way over the packet-switched network 101, in a leg between the gateway 108 and the far-end user terminal 102b.

Note: the server 104 and gateway 108 as referred to an illustrated herein are logical entities, and in practice may be implemented in separate physical equipment or the same or overlapping physical equipment, which may be implemented in one or more physical units at one or more geographical sites. Distributed computing techniques are known in the art and may be used to implement such an arrangement.

Optionally, if the mobile cellular network is one which provides a separate, general-purpose data channel in addition to the dedicated voice channel, then this may also provide the near-end terminal 102a and/or far-end user terminal 102b with an alternative or additional means of connecting to the packet-switched network 101.

FIG. 2 illustrates further detail of the near-end user terminal 102a. It will be appreciated that the far-end user terminal 102b may be configured in a similar manner.

The user terminal 102 comprises an operating system 200 and a plurality of applications, including the respective instance of the communication client application 103, and a dialler application 201, all arranged to run on the operating system 200. The applications 103, 201 and the operating system 200 take the form of software stored on a memory of the user terminal 102 and arranged to run on a processor of the user terminal 102. The memory on which this software is stored may comprise one or more memory units employing one or more memory media, e.g. a magnetic memory medium such as a hard disk, and/or an electronic memory medium such as an EEPROM ("flash" memory), and/or an optical storage medium. The different applications 103, 201 and the operating system may all be stored on the same unit and/or medium of the memory, or on different units and/or memory media of the memory, or some of the same and some different. Further, the processor on which the different applications 103, 201 and operating system are arranged to run may comprise one or more processor units. Various storage and processing arrangements will be familiar to a person skilled in the art and will not be listed here in detail.

The user terminal 102 also comprises a plurality of user input and output (I/O) devices 203, including at least one audio input device in the form of a microphone 208 and at least one audio output device in the form of at least one speaker 209. Optionally the user I/O device 203 may also comprise one or more further user input devices, e.g. a camera 206, keypad and/or touchscreen; and/or one or more further user output devices, e.g. a display screen 207 (which may also be a touchscreen).

Further, the user terminal 102 comprises a first network interface 204 for connecting to the packet-switched network 101 and a second network interface 205 for connecting to the PSTN network 109. For example, the first interface 204 may comprise a local wireless interface for connecting to the packet-switched network 101 via the access point 105, e.g. using a short-range RF technology such as Wi-Fi or Bluetooth. The second interface 205 may take the form of a mobile cellular interface for connecting to the PSTN network via the base station 107.

In operation, if a packet-switched call (e.g. VoIP call) is being conducted with the far-end user terminal 102b, then the live, incoming call media stream (including at least voice captured from the far-end user 106b) is received through the first network interface 204 and passed to the (near-end) communication client 103a via the operating system 200. The near-end client 103a decodes this and sends it to the user output device(s) 209, 207 via the operating system 200 to be played out. This includes at least playing out the received voice through the speaker 209, and optionally playing out other media such as playing out video of the far-end user 106b through the screen 207, or displaying IM messages composed by the far-end user 106b on the screen 207. With regard to the live, outgoing call media stream, this includes at least voice captured from the near-end user 106a using the microphone 208, and optionally other media such as video of the near-end user 106a captured through the camera 206, and/or IM messages composed by the near-end user 106a using the touch screen 207 or keypad (not shown). This outgoing media is passed via the operating system 200 to the near-end communication client application 103a which encodes it, then passes the encoded media via the operating system 200 to be sent out through the first interface 204 over the packet-switched network 101 to the far-end user terminal 102b to be played out.

In the case of a PSTN call being conducted with the far-end user terminal 102b or gateway 108, then the call media comprises only voice. The live, incoming voice signal is received through the second interface 205 and passed via the operating system 200 to the speaker 209 to be played out. The live, outgoing voice signal is captured from the near-end user 106a through the microphone, and passed via the operating system 200 to be sent out through the second interface 205 over the PSTN network 109 to the far-end terminal 102b to be played out there. The dialler application 201 handles the user interface allowing the near-end user 106a to enter a phone number to be dialled through the touchscreen 207, keypad or the like; whilst the operating system 200 is responsible for the call set-up. Or in an alternative implementation, the dialler 201 could be responsible for setting up the call.

A pure packet-switched call is usually preferred since users often pay only a fixed fee for packet-switched connectivity that is not dependent on the duration or volume of usage, or the packet-switched connectivity may even be free. E.g. the access point 105 may provide free connectivity such as free Wi-Fi (e.g. as a courtesy in a bar or café), or the near-end user 106a may be required to pay to use the access point 105 but only a flat fee (at least for a given period such as a day). Some users also pay for unlimited data via the data channel of their mobile cellular network 109. An alternative or additional reason to prefer a fully packet-switched call is that in addition to voice, the call can comprise additional media such as live video on one or both directions, or IM or screen sharing, etc.

On the other hand, sometimes the packet-switched connectivity between the near-end terminal 102a and the packet-switched network 101 may fail, either in that the quality deteriorates to an insufficient level for voice calling (e.g. the available bitrate becomes too low or the error rate becomes too high), or the connection is lost completely. For instance, the near-end user 102a terminal may move out of range of a wireless access point 105, or may enter a region where the data channel of the cellular network 109 is too weak or non-existent (though the voice channel may still be available). In such cases, conventionally the call is dropped and either one of the near- and far-end users 106 has to manually redial the other via the voice channel of the PSTN network 109, or else the call is simply abandoned.

To address such situations or similar, according to embodiments disclosed herein, the near-end communication client 103a is configured to automatically detect when the connection between the near-end user terminal 102a and the packet switched network 101 fails (e.g. when the wireless connection between the first network interface 204 and the wireless access point 105 fails). In embodiments, this may mean the client 103a is configured to detect when the connection is lost completely, and/or the client 103a is configured to detect when the connection falls below a predetermined threshold for quality. In the latter case, any suitable quality metric may be used. For example, the condition for failure of the packet-switched connection may be that the bitrate falls below a certain threshold, or that the error rate (e.g. packet loss rate) rises above a certain threshold. Various other suitable metrics for measuring connection quality will in themselves be known in the art.

Furthermore, the near-end client 103a is configured so as, in response to this detection, to conduct the call at least part way via the PSTN network 109 instead of entirely via the packet-switched network 101. This may comprise detecting the failure before the call starts and initiating the call via the PSTN network 109 (even if the user has selected to start a packet-switched call via the communication client application 103a); but it may also comprise detecting the failure during an existing packet-switched call currently being conducted fully over the packet-switched network 101, and in response switching to routing the call at least part way over the PSTN network 109. Technically speaking, behind the scenes, the continuation of "the" call may in fact amount to a new call being established after the original call is dropped. However, from the perspective of at least the near-end user 106a, this provides a relatively seamless experience, wherein the near-end user 106a is not required to manually redial the PSTN telephone number of the far-end user 106b. Hence the mechanism disclosed herein is particularly advantageous in scenarios where packet-switched connectivity fails mid call. The following examples will be described in terms of such a scenario, and for convenience the original packet-switched phase and the subsequent PSTN phase may be considered as two phases of the same call.

In embodiments, the original packet-switched call may be a call initiated by the near-end user 106a, i.e. the near-end user 106a is the caller and the far-end user 106b is the callee.

There are at least two possibilities for establishing the PSTN phase of the call. In a first possibility, the call is routed all the way over the PSTN network 10. To do this, the near-end client 103a obtains a PSTN number of the far-end user terminal 102a and uses this to dial the far-end user terminal 102b, by submitting the PSTN number to the PSTN network (either by interfacing with the dialler application 201 or acting directly through the operating system 200).

To obtain the PSTN number, in embodiments the near-end client application 103a may be configured to look up the PSTN number of the far-end user terminal 102b in a profile of the far-end user 106b, for instance a profile of the far-end user 106b associated with the packet-switched communication service being used (e.g. the particular VoIP service in question). Typically, a communication service such as a VoIP service will store a profile of each of its users in the server 104, and hence this will include a profile of the far-end user 106b. The profile may include information such as an avatar image, mood message, hometown, email address, etc., of the respective user. Another piece of information user typically include in their profile is a PSTN phone number via which they can be contacted by telephone. The profile, or selected items in the profile, may be made available to all other users of the communication service in question; or the profile, or selected items in it, may only be available to certain users which the user whose profile it is has selected as contacts. Either way, assuming the near-end user 106a is a contact of the far-end user 106b, then the near-end client 103a will be able to look up whether the far-end user has a PSTN number in his or her profile, and if so to capture this from the profile and use it to establish the PSTN phase of the call.

In a second possibility, the PSTN phase of the call may be conducted only part way over the PSTN network. In this case, the PSTN number used by the near-end client 103a to establish the PSTN fall-back is a gateway PSTN number mapped to the user ID of the far-end user 106b in the gateway phone number database 110. Thus when the near-end client 103a dials the gateway PSTN number, the call continues by being routed via the gateway, such that the leg between the gateway 108 and the far-end user terminal 102b is still over the packet-switched network, as discussed previously.

In some cases, the far-end user 106b may have a permanent gateway PSTN number already mapped to his or her user ID in the database 110. However, gateway PSTN numbers are a finite resource: there are far fewer in existence than there are users of a typical VoIP service. Hence a user has to pay to own a permanent gateway PSTN number. If the far-end user 106a does indeed have the luxury of owning such a number, then the near-end client 103a may obtain this number in the same manner as described above in relation to the PSTN number of the far-end terminal 102b—i.e. by querying the far-end user's profile. However, if the far-end user 106b does not have a permanent PSTN number, then the near-end client 103a may still use a PSTN fallback by requesting that a gateway PSTN number is temporarily allocated to the far-end user 106a in the database.

To do this the near-end client contacts the database 110 on the server 104, to submit a request comprising the user ID of the far-end user 106b. In response, if a spare gateway PSTN number is currently available, the database allocates one of the spare gateway PSTN numbers to the far-end user 106b by mapping this gateway PSTN to his or her user ID. The database 110 also returns this PSTN number to the near-end client 103a. The near-end client 103a then uses the returned PSTN number to establish the PSTN phase of the call via the gateway 108.

The temporary gateway PSTN number remains allocated to the far-end user 106b at least for the duration of call, then is relinquished again after the call is finished (to be available to be allocated to another user). E.g. one of the near-end or far-end clients 103a, 103b, or the gateway 108, may be configured to send a signal to the database 110 upon termination of the call, triggering the database 110 to de-allocate the temporary gateway PSTN number from the far-end user 106 at the end of the call. Alternatively, the database 110 may be configured to automatically de-allocate the temporary gateway PSTN number after a predetermined time period has elapsed since the allocation, the time period being set to be long enough that it is reasonable to assume the call would have finished (e.g. >=3 hours).

Furthermore, in embodiments the mapping 110 provided by the gateway 108 may in fact be a three-piece mapping. As mentioned, the availability of PSTN numbers to be used as gateway numbers is typically limited—there are typically many usernames registered for a VoIP service, and not enough to allocate one to every username (given that the majority of the PSTN numbers are already claimed or reserved for PSTN phones). In fact, there may not even be enough PSTN numbers available to allow even a temporary mapping that is unique to a given username for each of the users currently requiring a temporary gateway PSTN number. Hence in embodiments, the mapping in the gateway 108 in fact maps a gateway PSTN number to a unique pair of caller PSTN number and callee username (thus each entry in the database 110 comprises three elements). I.e. it is a pairing of sender and recipient that maps to a gateway number. This way the same gateway PSTN number can be re-used for a different caller-callee pair. So if a different caller calls the same gateway PSTN number, then this maps to a different callee.

Note: in order to look up the PSTN number of the far-end terminal 102b in the far-end user's profile on the server 104, or in order to request a temporary gateway PSTN number to be allocated to the far-end user 106b in the database 110, then the near-end user terminal 102a will need connectivity to the packet-switched network 101 (e.g. Internet). If the detected failure is only a deterioration in quality, the near-end client 103a may still be able to do this via the packet-switched connection between the first interface 204 and the packet switched network 101—because the phone number and the request to the database 110 are only small pieces of information and so may be able to be communicated between the near-end user terminal 102a and the server 104 via the packet-switched network 101 even with a poor quality connection. However, to guard against the possibility of total loss of connectivity to the packet-switched network, the near-end client 103a may be configured to retrieve the PSTN number from the far-end user's profile, or to request the temporary gateway PSTN number, automatically at the beginning of the call, when the initial packet-switched call is established whilst the connection to the packet-switched connection is still good (or at least shortly after before it fails). The near-end client 103a then stores this pre-emptively retrieved or requested PSTN number locally in local memory of the near-end terminal 102a, for use in case the connection to the packet-switched network 101 fails later during the call.

An alternative in the case of a PSTN number of the far-end user terminal 102b, or a permanently owned gateway PSTN number of the far-end user 106b, is for the near-end client to retrieve the number from the far-end user's profile and store it prior to the call, in anticipation that a call might be made. For instance, the near-end client 103a may be configured to periodically poll the profiles of the contacts of the near-end user 106a for PSTN numbers when no calls are being conducted by the near-end client (e.g. once per day or once per hour), or to poll the contacts' profiles at random intervals.

Another alternative is to try to predict when a currently ongoing packet-switched call is about to fail, and to retrieve or request the PSTN number in response to this prediction.

To do this, the near-end terminal 102a is equipped with a suitable interface to access a positioning (localization) system. For example, the near-end terminal 102a may comprise a satellite receiver such as a GPS receiver (not shown) for receiving signals from multiple satellites of a satellite-based positioning system such as a GPS system, and determining the geographic location of the near-end terminal 102a based on the received signals. As another example, one of the first and second wireless network interfaces 204, 205 may be used to receive signals from multiple access points 105 or base stations 107 respectively, for determining the location of the near-end user terminal 102a based on the received signal strengths of these signals.

Further, the near-end client 103a is arranged to access a location database (not shown) via the packet-switched network 101, wherein the location database comprises location-dependent information such as information on coverage of some or all of the access points 105 of the packet-switched network 101 and/or coverage of some or all of the base stations 107 of the PSTN network 109. As another example the location dependent information may comprise information on geographical obstacles to the transmission of wireless signals between the near-end user terminal 102a and the packet-switched network 101, e.g. obstacles such as tunnels. In embodiments the location-dependent information may be crowd sourced.

In such embodiments, the near-end client 103a is configured to use the relevant interface on the near-end user terminal 102a to access the positioning system in order to determine the current geographical location of the near-end user terminal 102a. Further, the near-end client 103a is configured to submit the determined location to the location database in order to look up the location-dependent information mapped to the current location of the near-end terminal 102a, and/or the vicinity of the current location. The near-end client 103a does this in a continual fashion (e.g. periodically) during the first, packet-switched phase of the call while the connection to the packet-switched network is still good. Thus the client 103a can track the location of the near-end user terminal 102a and, based thereon, the current conditions or surroundings of the near-end terminal 102a. Further, from tracking the movement of the position of the near-end user terminal 102a, the client 103a can anticipate the future position of the near-end user terminal by extrapolating the current trajectory, and based on this, can anticipate upcoming changes in the conditions or surroundings of the near-end user terminal 102a. Thus, the near-end client 103a can predict likely upcoming changes such as reduced data coverage for the packet-switched network 101, or obstacles that are likely to block wireless access to the packet switched network 101.

The near-end client 103a is configured so as, in response to detecting such an upcoming problem with the data connectivity, to automatically look up a PSTN number of the far-end user terminal 102b in the profile of the far-end user 106b, or to request a temporary gateway PSTN number for the far-end user 106b, via the packet-switched network 101 while the wireless connection between the near-end user terminal 102a and the packet-switched network is still good (before the upcoming failure). The client can then use this retrieved or requested PSTN number to continue the call at least part way via the PSTN network if the predicted failure does indeed occur. For instance, if it is predicted that the near-end user terminal 102a is about to enter a low coverage area of the cellular network 109 or to enter a tunnel, where the coverage might be too poor for sufficient data connectivity for a packet-switched voice call, but where the coverage might be just about good enough to allow a call over the basic voice channel, then the near-end client 103a can take measures to prepare to switch to a PSTN call over the voice channel.

There are a number of options for the user experience. In embodiments, the communication client 103a may establish the new PSTN phase of call completely automatically without even alerting the near-end user 106a that the call is being switched to PSTN. If the new phase of the call is set up quickly enough, the near-end user 103a may simply experience this is a minor glitch and think no more about it. Alternatively, the while the new PSTN phase of the call is being established, the near-end communication client 103a may output a notification to the near-end user 106a explaining that the call is being switched to PSTN, but nonetheless the near-end client 103a proceeds with the switch completely automatically without requiring any manual confirmation from the near-end user 106a. As another alternative, the near end-client 103a may prompt the near-end user 106a to confirm whether he or she wishes to switch to conducting the call via PSTN. For instance, the near-end user 106a may be provided the option to confirm the switch by pressing an onscreen button in the notification, or by performing an intuitive gesture such as shaking the near-end user terminal 102a (detected by means of one or more inertial sensors onboard the near-end user terminal 102a, not shown).

Regarding the experience of the far-end user, if the PSTN phase of the call is a pure PSTN call (routed all the way over the PSTN network 109), then far-end user 106 will see a new incoming PSTN call which he or she would then have to answer in the normal way. However, the incoming call would arrive very shortly after the VoIP call was dropped (perhaps only a few of seconds or even less than a second). Therefore, this provides a "semi seamless" experience from the point of view of the far-end user 106bThis could also be the experience if the PSTN phase of the call is routed via the gateway 108. However, in that case, alternatively there is the possibility to configure the gateway 108 to send a signal to the far-end client 103b via the packet-switched network 101, informing it that the incoming call is a continuation of the recently-ended VoIP phase of the call. The far-end client 103b can be configured to recognize this signal and, in response, to automatically answer the new incoming call request on behalf of the far-end user 106b. The far-end client may also present the new phase of the call to the far-end user 106b as a continuation of the existing VoIP call. Thus in embodiments, the far-end user 106b only experiences a short period of silence or a short "blip" in the call. Therefore, the far-end user 106b can be provided with an almost seamless experience as well.

If the PSTN phase of the call is a pure PSTN call, in embodiments the far-end user 106a will need to manually re-answer the PSTN call through the dialler app 201 on the far-end user terminal 102b. However, in alternative embodiments, the operating system 200 on the far-end user terminal 120b may be configured to enable the far-end VoIP application 103b to answer the incoming call automatically. E.g. the operating system may provide SDK access to enable another application to pick up a call.

The disclosed mechanism may be useful for both consumer and business scenarios. In the later, the assigned PSTN number may additionally be used to automatically authenticate the user dialling in to the meeting (i.e. no need for use for room number or PIN). Here, the idea is to use the PSTN callerID of the caller: the invited users are mapped to PSTN numbers, and when a mapped number is detected, it is automatically allowed into the conference. Consider a conference call having three or more participants including a user who loses packet-switched data connectivity during the call. If the gateway service has created a mapping between the user's username in the packet-switched system and a PSTN phone number, then the user can immediately dial in to a conference call without needing to present other credentials because the mapping 110 provides the required trust in the user's identity. E.g. the user is currently in a VoIP call but then the call drops or the connection degrades, that user can be automatically re-joined to the conference call, it being an inherent feature of the above-described implementation that the VoIP service already has enough information from the mapping 110 to know the identity of the user re-joining via PSTN.

The above has been described in terms of a client-side implementation. However, a server side implementation is also possible. For instance, instead of the client application 103a, 103b being installed on the respective user terminal 102a, it is equivalently possible that one or both of the first and second user terminals 102a, 102b accesses a server-hosted instance of the client 103 in order to provide the same functionality. For instance, one or both of the first and second user terminals 102a, 102b may access a web-hosted instance of the client 103 via a general purpose web browser installed on the respective user terminal. If a server-hosted instance of the client 103a is used by the first user terminal 102a, then the PSTN fall-back functionality will be implemented on the server 104 instead of the near-end user terminal 102a or even with both clients 103a, 103b being implemented on the respective user terminals 102a, 102b, a centralized function may nonetheless be implemented on the server 104 to provide the PSTN fall-back functionality.

In such implementations, the server 104 may not be able to control the first user terminal 102a to instate the switch to PSTN, due to the poor or non-existent connection between the first user terminal 102a and the packet-switched network. However, he server 104 can control the second user terminal 102b or the gateway 108 to call back the first user terminal 102a via PSTN.

It will be appreciated that the above embodiments have been described only by way of example.

More generally, according to one aspect of the present disclosure, there is provided a near-end user terminal for conducting a call with a far-end user terminal, between a near-end user being a user of the near-end terminal and a far-end user being a user of the far-end terminal; the near-end user terminal comprising: at least one first network interface operable to form a connection between the near-end user terminal and a packet switched network, for conducting the call over the packet switched network using a packet-based voice calling service; a second network interface operable to form a connection between the near-end user terminal and a PSTN network; memory comprising one or more memory units, the memory storing a communication client application; and processing apparatus comprising one or more processing units, the processing apparatus being arranged to run the communication client application; wherein the communication client application is configured so as when run on the processing apparatus to perform operations of: detecting a failure in the connection between the near-end terminal and the packet switched network, and in response conducting the call at least part way over the PSTN network by using the second interface to conduct the call via the connection between the near-end user terminal and the PSTN network.

In embodiments, the communication client application may be configured so as when run on the processing apparatus to perform operations of: prior to said failure, initially establishing the call all the way over the packet-switched network using the packet-switched voice calling service, by using the first network interface to conduct the call via the connection between the near-end user terminal and the packet-switched network, and via a connection between the packet-switched network and the far-end user terminal; and then in response to the detection of said failure, during the call, switching the call to being conducted at least part way over the PSTN network, by said use of the second interface to conduct the call via the connection between the near-end user terminal and the PSTN network.

In embodiments, the failure may comprise the connection between the near-end user terminal and the packet-switched network being completely lost.

In embodiments, the failure may comprise the connection between the near-end user terminal and the packet-switched network falling below a threshold quality.

In embodiments, the near-end user terminal may be a mobile user terminal, said first network interface being a wireless interface to a wireless access point of the packet-switched network, said connection between the near-end user terminal and the packet-switched network being a wireless connection, said second network interface being a wireless interface to a cellular base station of the PSTN network, and said connection between the near-end user terminal and the PSTN network being a wireless connection.

In embodiments, the communication client application may be configured such that said conducting of the call via the PSTN network comprises: conducting the call all the way over the PSTN network, by conducting the call via a connection between the PSTN network and the far-end user terminal using a PSTN number of the far-end user terminal.

In embodiments, the communication client application may be configured such that said conducting of the call via the PSTN network comprises: conducting the call only part way over the PSTN network, by conducting the call via a gateway between the PSTN network and the packet-switched network using a gateway PSTN number mapped to a user ID identifying the far-end user within the packet-switched voice calling service, and via a connection between the packet-switched network and the far-end terminal via the packet-switched network using the packet-switched voice calling service and the user ID of the far-end user.

In embodiments, the communication client application may be configured to look up said PSTN number in a profile of the user of the far-end user terminal prior to the failure of said connection between the near-end user terminal and the packet-switched network, the profile being associated with the packet-switched voice calling service.

In embodiments, the packet-switched voice calling service may have multiple users including the near-end user and far-end users, the multiple users being assigned respective user IDs identifying them within the packet-switched voice calling service; and the communication client application may be configured so as when run on the processing apparatus to perform operations of: accessing a phone number database which allocates a respective gateway PSTN number to each of only a subset of the user IDs, there being fewer gateway PSTN numbers available to be allocated to the user IDs than there are user IDs assigned to multiple users in the packet-switched voice calling service; and via said accessing, requesting that an available one of said gateway PSTN numbers is temporarily allocated to the user ID of the far-end user in order to enable said conducting of the call via the gateway.

In embodiments, the communication client application may be configured to perform said accessing of the number database via said connection between the near-end user terminal and the packet switched network, using the first network interface.

In embodiments, the communication client application may be configured so as, when run on the processing apparatus, to make said request for the allocation of the temporary gateway PSTN number prior to the failure of said connection between the near-end user terminal and the packet-switched network.

In embodiments, the communication client application may be configured to make said request upon the initiation of the call.

In embodiments, the communication client application may be configured so as when run on the processing apparatus to: use a localization system to track a current location of the near-end user terminal, access a location database to look-up location-dependent information mapped to the current location, use the location-dependent information to predict said failure in advance of said failure, and make said request in response to the prediction.

In embodiments, the location-dependent information may comprise information on: presence of obstacles to propagation of wireless signals, geographical coverage of one or more wireless access points of the packet-switched network, and/or geographical coverage of one or more base stations of the PSTN network.

In embodiments, the location dependent information may be crowd sourced; and the communication client application may be configured so as, when run on the processing apparatus, to access the location database from a crowd sourcing server.

In embodiments, the communication client application is configured to perform said accessing of the location database via said connection between the near-end user terminal and the packet switched network, using the first network interface.

In embodiments, the communication client application is configured so as, when run on the processing apparatus, to make said request for the allocation of the temporary gateway PSTN in response to said failure, by making the request via the below-threshold quality connection between the near-end user terminal and the packet-switched network.

According to another aspect disclosed herein, there is provided a server for controlling a call between a calling user terminal and a callee user terminal, wherein the calling user-terminal initiates the call to be established with the callee user terminal; the server being configured to perform operations of: detecting a failure of the connection between the calling user terminal and a packet-switched network; and in response, causing the call to instead be conducted at least part way over a PSTN network, via a connection between the calling user terminal and the PSTN network.

In embodiments the server may be configured to perform said causing by: sending a request from the server to the callee user terminal via the packet-switched network, to request the callee user terminal to call back the calling user terminal at least part way via the PSTN network, at least via said connection between the calling user terminal and the PSTN network. Alternatively, the server may be configured to perform said causing by: sending a request from the server to a gateway between the packet-switched network and the PSTN network, to request the gateway to re-establish the call via said connection between the calling user terminal and the PSTN network, and via a connection between the called user terminal and the packet-switched network.

According to another aspect disclosed herein, there is provided a method of controlling a call between a first user terminal and a second user terminal, wherein the call is initially conducted via a packet-switched connection between the first user terminal and a packet-switched network; the method comprising: during the call, detecting a failure of the connection between the first user terminal and the packet-switched network; and in response, causing the call to switch to being conducted at least part way via a PSTN network, via a connection between the first user terminal and the PSTN network.

Other variants or use case may be apparent to a person skilled in the art given the disclosure herein. The scope of the present disclosure is not limited by the above embodiments but only by the accompanying claims.

The invention claimed is:

1. A near-end user terminal comprising:
a first network interface configured to establish a first connection between the near-end user terminal and a packet switched network (PSN);
a second network interface configured to establish a second connection between the near-end user terminal and a Public Switched Telephone Network (PSTN);
a processor; and a memory in communication with the processor, the memory comprising executable instructions that, when executed by the processor, cause the processor to control the near-end user terminal to perform functions of:

establishing, using the first network interface, the first connection between the near-end user terminal and the PSN for a call with a far-end user terminal connected to the PSN;

determining that the first connection experiences a failure during the call;

determining that the far-end user terminal is not allocated with a PSTN number;

sending, to a server providing a packet-switched communication service, a request for a gateway PSTN number to be temporarily allocated to the far-end terminal for a PSTN fallback; and  establishing, using the second network interface, the second connection between the near-end user terminal and the PSTN for the call with the far-end user terminal, the call established via the second connection being routed to the far-end user terminal via the PSN based on the gateway PSTN number allocated to the far-end user terminal.

2. The near-end user terminal of claim 1, wherein the failure comprises the first connection being completely lost.

3. The near-end user terminal of claim 1, wherein the failure comprises the first connection falling below a threshold quality.

4. The near-end user terminal of claim 1, wherein the first network interface is configured to establish the first connection via a Wi-Fi network connection, and the second network interface is configured to establish the second connection via a cellular network connection.

5. The near-end user terminal of claim 1, wherein, when executed by the processor, the instructions further cause the processor to control the near-end user terminal to perform a function of receiving, from the server, the gateway PSTN number assigned allocated to the far-end user terminal.

6. The near-end user terminal of claim 1, wherein the server has access to a database storing a spare gateway PSTN number.

7. The near-end user terminal of claim 1, wherein, when executed by the processor, the instructions cause the processor to control the near-end user terminal to perform the function of sending the request for the gateway PSTN number prior to an occurrence of the failure.

8. The near-end user terminal of claim 1, wherein, when executed by the processor, the instructions cause the processor to control the near-end user terminal to perform the function of sending the request for the gateway PSTN number upon initiating the call.

9. The near-end user terminal of claim 1, wherein, to determine whether the first connection experiences a failure during the call, the instructions, when executed by the processor, further cause the processor to control the near-end user terminal to perform functions of:

determining a location of the near-end user terminal;

accessing a location database to obtain location-dependent information of the determined location of the near-end user terminal; and  predicting the failure based on the obtained location-dependent information.

10. The near-end user terminal of claim 9, wherein the location-dependent information comprises at least one of:

presence of obstacles to propagation of wireless signals;

geographical coverage of one or more wireless access points of the PSN; and  geographical coverage of one or more base stations of the PSTN.

11. The near-end user terminal of claim 9, wherein the location dependent information is crowd sourced.

12. The near-end user terminal of claim 9, wherein the location database is connected to the PSN.

13. A method of operating a first device, comprising:

establishing a first connection between the first device and a packet switched network (PSN) for a call with a second device connected to the PSN;

determining that the first connection experiences a failure during the call;

determining that the second device is not allocated with a Public Switched Telephone Network (PSTN) number;

sending, to a server providing a packet-switched communication service, a request for a gateway PSTN number to be temporarily allocated to the second device for a PSTN fallback; and  establishing a second connection between the first device and PSTN for the call with the second device, the call established via the second connection being routed to the second device via the PSN based on the gateway PSTN number allocated to the second device.

14. The method of claim 13, wherein the second connection is established via a gateway between the PSTN and PSN based on the gateway PSTN number allocated to the second device connected to the PSN.

15. The method of claim 13, wherein the server has access to a database storing a spare gateway PSTN number.

16. The method of claim 14, wherein determining whether the first connection experiences a failure during the call comprises:

determining a location of the first device;

accessing a location database to obtain location-dependent information of the determined location of the first device; and  predicting the failure based on the obtained location-dependent information.

17. The method of claim 16, wherein the location-dependent information comprises at least one of:

presence of obstacles to propagation of wireless signals;

geographical coverage of one or more wireless access points of the PSN; and  geographical coverage of one or more base stations of the PSTN.

18. A non-transitory computer readable medium containing instructions for causing a computer to perform functions of:

establishing a first connection between a first device and a packet switched network (PSN) for a call with a second device connected to the PSN;

determining that the first connection experiences a failure during the call;

determining that the second device is not allocated with a Public Switched Telephone Network (PSTN) number;

sending, to a server providing a packet-switched communication service, a request for a gateway PSTN number to be temporarily allocated to the second device for a PSTN fallback; and  establishing a second connection between the first device and PSTN for the call with the second device, the call established via the second connection being routed to the second device via the PSN based on the gateway PSTN number allocated to the second device.

\* \* \* \* \*